Aug. 17, 1926.

S. F. ANDERSON 1,596,514

METHOD OF AND APPARATUS FOR CUTTING AND WRAPPING PLASTIC MATERIAL

Filed August 8, 1924

Inventor
Swan F. Anderson
By Nilson and McCanna
Attys

Aug. 17, 1926.
S. F. ANDERSON
1,596,514
METHOD OF AND APPARATUS FOR CUTTING AND WRAPPING PLASTIC MATERIAL
Filed August 8, 1924   3 Sheets-Sheet 2
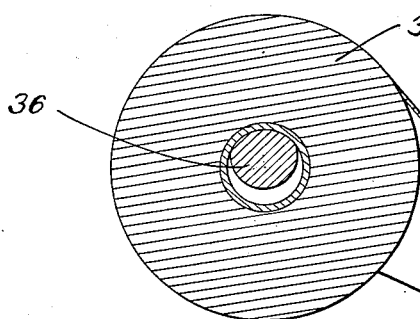
Fig. 3.
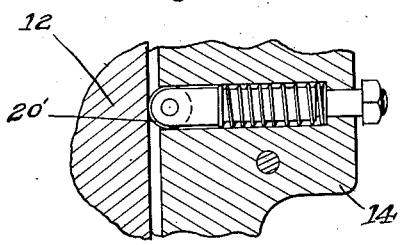
Fig. 4.
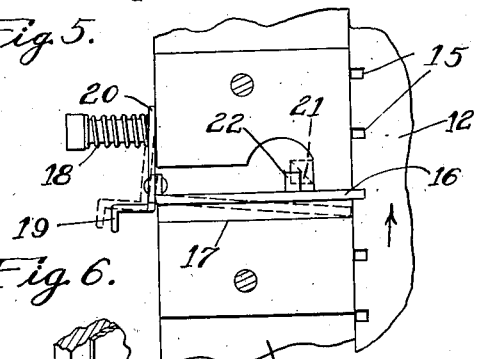
Fig. 5.
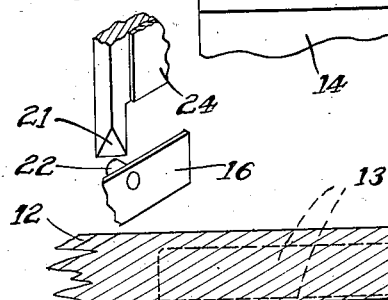
Fig. 6.
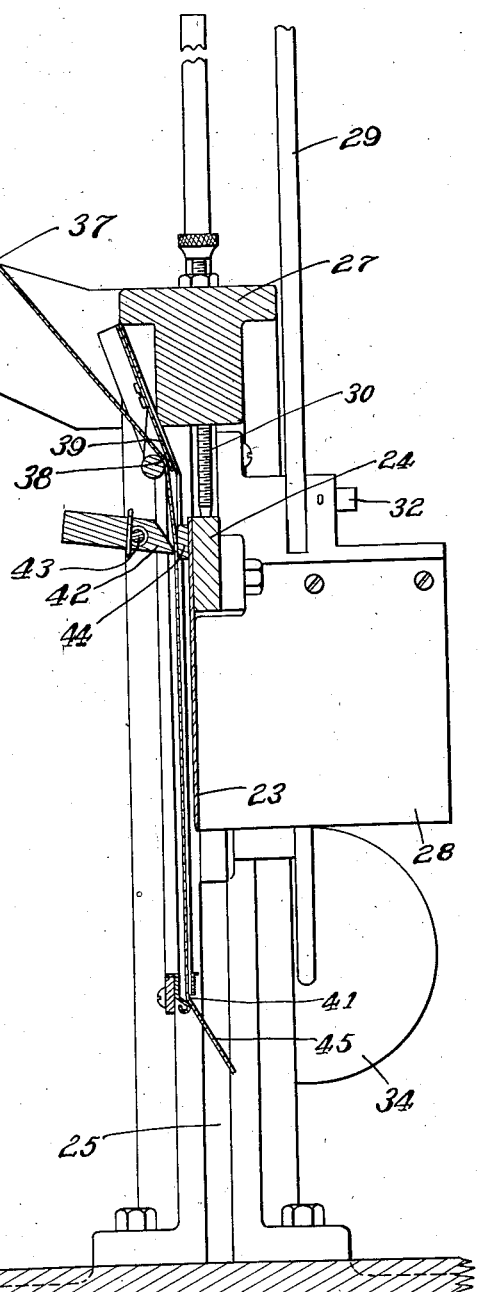
Swan F. Anderson, Inventor.
By Wilson and McCanna, Attys.

Aug. 17, 1926.
S. F. ANDERSON
1,596,514
METHOD OF AND APPARATUS FOR CUTTING AND WRAPPING PLASTIC MATERIAL
Filed August 8, 1924    3 Sheets-Sheet 3
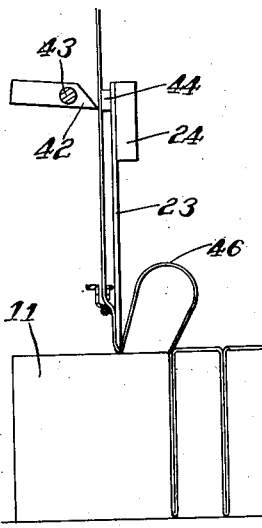
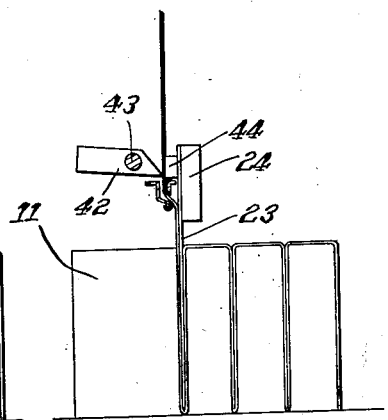
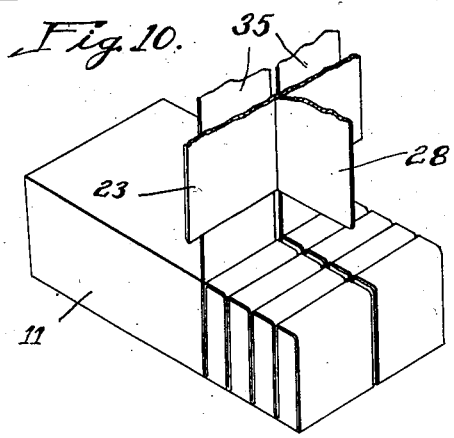
Inventor:
Swan F. Anderson
By Wilson and McCanna
Attys.

Patented Aug. 17, 1926.

1,596,514

UNITED STATES PATENT OFFICE.

SWAN F. ANDERSON, OF ROCKFORD, ILLINOIS, ASSIGNOR TO ANDERSON BROS. MFG. CO., OF ROCKFORD, ILLINOIS, A CORPORATION OF ILLINOIS.

METHOD OF AND APPARATUS FOR CUTTING AND WRAPPING PLASTIC MATERIAL.

Application filed August 8, 1924. Serial No. 730,827.

This invention relates to the cutting and wrapping of plastic material and, while adapted for various materials, it is especially designed and illustrated herein for use in cutting an ice cream slab into individual slices, bars or bricks and wrapping each piece for protective purposes and for convenience in handling and packing.

The primary purpose of my invention is to provide an improved method of and apparatus for cutting plastic material such as ice cream or the like, into slices, bars or bricks, and wrapping them.

One of the principal features of my invention is the provision for cutting and wrapping the material in one operation. That is, the wrapper is applied simultaneously with and by the act of cutting. This method enables the use of an exceptionally simple and practical apparatus whereby the cutting and wrapping operations may be quickly and easily performed. It also promotes a distinct economy in preparing and handling individual bricks or slices of ice cream, as will be apparent from the present disclosure.

Other objects and attendant advantages will be appreciated by those skilled in this art as the invention becomes better understood by reference to the following description when considered in connection with the accompanying drawings, in which Figs. 1 and 2, are end views of a machine for performing the method embodying my invention;

Fig. 3, is an enlarged vertical section longitudinally through the machine taken substantially on the line 3—3 of Fig. 1;

Figs. 4 and 5, are horizontal detail sections taken substantially on the lines 4—4 and 5—5 respectively of Fig. 1;

Fig. 6, is a perspective view showing a detail in connection with the table or carrier feed;

Figs. 7, 8 and 9 are views illustrating successive steps in performing the method; and Fig. 10, is a perspective view showing a number of individual bars or slices being cut and wrapped.

Figure 1:
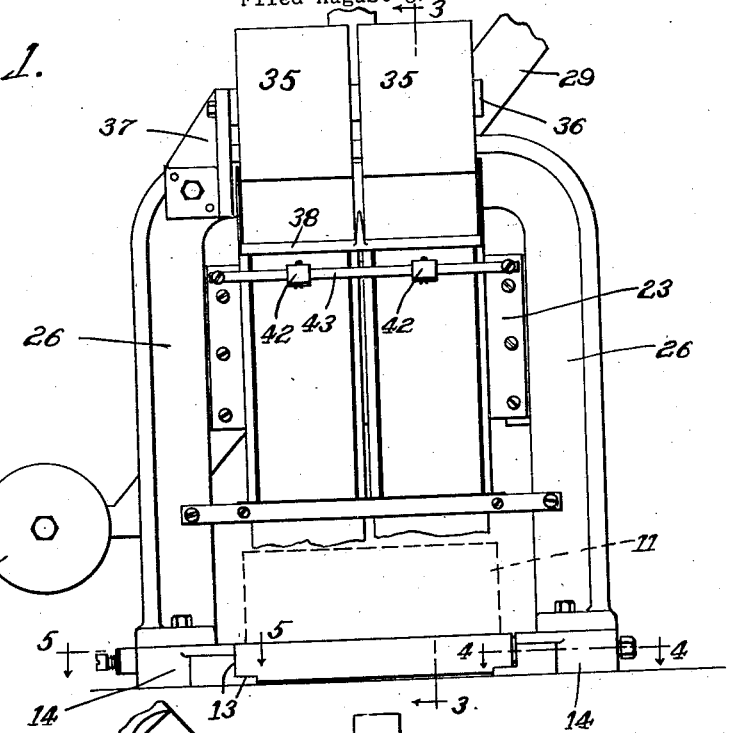
Figure 2:
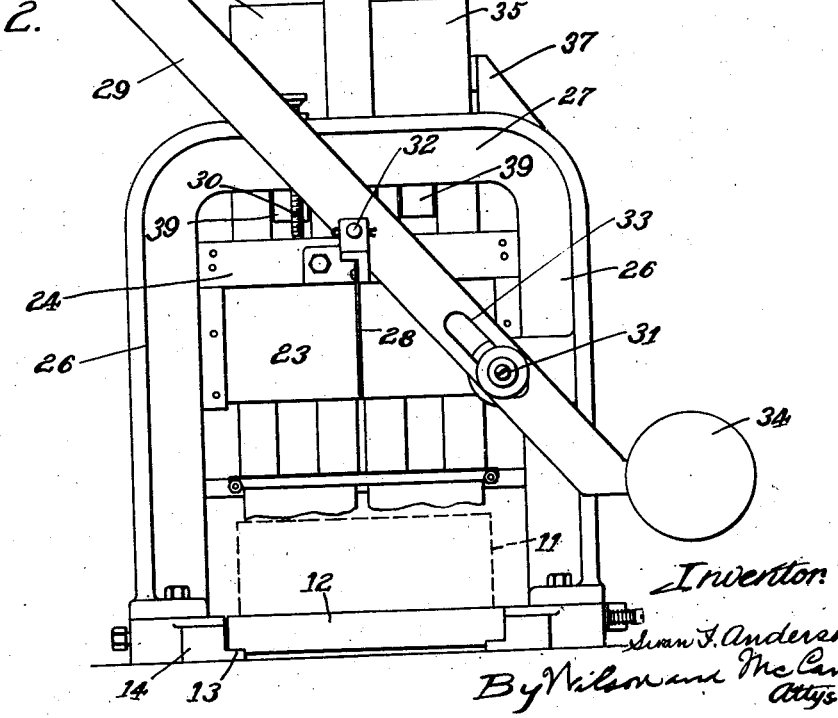

The method will be readily understood from the following description of the machine or apparatus and its function. It should be borne in mind however that the present machine is shown for purpose of illustration merely and that any suitable apparatus may be employed for performing the method. In fact, the method may be performed almost entirely by hand with the aid of a cutting blade and wrapper as will be presently seen.

The slab or brick of ice cream or other material to be cut, designated generally by 11, will be placed on a table or carrier 12. This table may be of any suitable construction and is preferably mounted so that it may be moved in step-by-step movements with respect to a cutting blade so as to advance the slab a predetermined distance each time for cutting off a slice or bar. At present the table is of wood and slides on suitable ways 13 on a bed 14.

Suitable means may be employed for feeding and stopping the table at predetermined intervals, thus determining one dimension of the cutoff bar. As shown in Fig. 5 the table is notched along one edge as at 15 and a spring-pressed detent 16 is adapted to enter any notch and hold the table from movement in the direction of the arrow shown in said figure. Said detent is enclosed in a slot 17 in the bed or base 14 and has an outer end 20 engaged by a spring 18 which urges the detent into the position shown. The detent may be withdrawn by hand by withdrawal of the finger grip 19, thereby allowing the table to be pushed or fed forwardly by hand or any suitable means to advance the slab of material beneath the cutting blade. When the detent is withdrawn it assumes the dotted line position shown in which it bears against the slotted edge of the table and when the table is advanced sufficiently said detent will snap into the next succeeding notch, thereby locating the table in a set position. While in this case the notches 15 determine the thickness of the smallest slices to be cut, it will be manifest that slices or bars of greater thickness or length may be cut by feeding the table along two or more notches. The detent will be automatically withdrawn at the end of the cutting stroke by means of a beveled face part 21 on the blade carrier, which face engages a laterally projecting pin 22 on the detent at the end of said cutting stroke and withdraws therefrom when the blade is raised. In the present case a spring-pressed roller 20' (Fig.

4) urges the table against the detent side of the bed and imposes a friction on the table.

The cutter or cutting blade 23 extends transversely of the slab and is carried in a vertical plane by a head or carrier designated generally by 24 which is mounted to slide vertically in suitable ways 25 (Fig. 3) in upright frame members 26 which are joined overhead at 27. While said blade does not actually touch the material when cutting because it is enveloped by a wrapper which is forced by the blade through the material, nevertheless I have for convenience in describing the invention referred to the blade as a cutting blade because it moves in a cutting stroke and indirectly cuts the material. In the present embodiment of my invention a longitudinal blade 28 is fixed to the transverse blade or to the head 24 midway between the ends of said transverse blade so as to cut the slab longitudinally at the same time it is cut transversely.

The blade carrier may be moved vertically by any suitable means such for example as a hand lever 29. In this instance said hand lever is fulcrumed at 31 on one of the frame members 26 and has a pivotal connection at 32 with the blade carrier. A slot 33 in the lever 29 affords the necessary play between the fulcrum pin 31 and the lever to permit operation thereof. A counter weight 34 on the lever makes for easier operation, as will be obvious. An adjustable screw stop 30 limits the upward movement of the blade carrier. It will be manifest that the blade carrier may be lowered and raised in a cutting and a return stroke by similar operation of the hand lever.

The wrapper of sheet material is preferably in a continuous strip fed from a roll 35. In this case two rolls are provided, each for wrapping the material cut at one side of the longitudinal blade 28, the rolls being carried overhead on a spindle 36 by means of a bracket arm 37 fixed to the upright frame. Each wrapper is run through a guide which holds it in close proximity to and parallel with the transverse blade 23 from a point just above the slab to a point above the raised position of the blade carrier. This guide consists at present of a stationary and a yieldable element 38—39 respectively at the upper end and guide elements at the lower end providing a downwardly and forwardly inclined mouth 41 from which the wrapper emanates.

Said wrappers are adapted to be fed down through said guide means by dogs 42 pivoted on a supporting bar 43 fixed to the blade carrier as clearly shown in Fig. 1. Each dog is pivoted off center so that the weight of its longer end yieldingly holds its gripping end against the wrapper and in turn against a wrapper-contact face 44 on the blade carrier. By means of these feed dogs the wrappers will be fed down through the guiding means simultaneously with and by the act of lowering the blade carrier in a cutting stroke and will release from and slide over the wrappers on the return stroke. This construction permits the wrappers to be pulled through the guiding means and past the feed dogs independently of movement of the blade carrier.

The operation is as follows: The operator will feed the table forward, that is, to the right viewing Fig. 3 until the slab is advanced in front of the transverse cutting blade 23 the proper distance for the size of the slice or bar to be cut, as determined by the position of the slab on the table and the setting of the latter by means of the detent 16 as described above. The ends 45 of the wrappers will then be pulled out over the advanced end of the slab a sufficient length to provide a wrapper around the forward end and the top of the advanced portion or part of the slab to be cut off. With the wrapper in the position shown in Fig. 3 the operator will press down on the hand lever 29, thereby simultaneously feeding the cutter blades and the wrappers down in a cutting and wrapping stroke. Inasmuch as the wrapping of each bar is the same a description of one will suffice. During approximately one-half of said down strokes the forward end portion 45 of the wrapper will be passed through the guide mouth 41, over the advanced end of the slab and across the path of the cutting blade. At this point the leading end 45 of the wrapper strip will be of a length sufficient to cover one end and the top of the bar to be cut off. The cutting blade 23 as it continues in its down stroke will strike the interposed wrapper and force it down into the slab. Because of the plastic composition of the slab the wrapper will not be cut but will remain enveloped about the blade and will be forced down through the slab or in other words drawn through the slab to the full depth of the cut so that when the blade is withdrawn two thicknesses of the wrapper will be left in the kerf or between the separated pieces of the slab. This position of the parts is shown in Fig. 7 which likewise shows the slab advanced for the next cutting operation. On the next succeeding down stroke the wrapper will be fed through the guide mouth 41, in advance of the cutting blade 23 until intercepted by the approaching blade as shown in Fig. 8, at which point there will be a loose advance or leading end portion 46 of the wrapper which is adapted to be drawn down into the cut for wrapping one side and end of the piece of material to be cut off. Fig. 9 shows the cutting blade at its lowest point, which completes the cutting and wrapping operation. In other words with the down stroke of the cutting blade one side and the top of the piece being cut off will be wrapped and the adjacent side of the following piece will likewise be wrapped. The wrapper thus entered into the material by the cutting stroke adheres to the separated sides of said material, allowing the blade to withdraw. The foregoing operation will be repeated so as to simultaneously cut and wrap slices or bars in succession. By employing a longitudinal blade 28 and separate wrappers as disclosed herein two rows of individual slices will be cut and wrapped from a single slab. This particular arrangement is especially desirable in connection with the sale of ice cream as it affords a convenient, economical and thoroughly practical method of preparing individual portions of ice cream. Said individual portions or slices may be separated one from another by cutting the wrapper at the bend between two slices. It will be manifest that a wider slice may be cut and wrapped simply by advancing the table a greater distance, in which case the wrappers will be drawn through the guiding means to provide the additional top wrapper. It will also be manifest that at the end of each down stroke the cam face 21 under the blade carrier will retract the detent 16 so that it will assume the dotted line position shown in Fig. 5, whereupon the table may be advanced to the next position as described above.

The method of cutting and wrapping disclosed herein may be practiced by any means or apparatus suitable for the purpose and it should be expressly understood that the method claims are in no way limited to the apparatus shown, nor is the method in its broader sense limited to the use of a continuous strip wrapper, as individual wrappers might be used.

The word "wrapper" is used herein as meaning any suitable material in sheet form for covering or enclosing the cut off bar and is in no way limited to a printed wrapper. In practice, in the instant case, the wrapper is of parchment paper, which may if it is desired have printed matter on the outer side, that is, the side away from the ice cream bar.

It is believed that the foregoing conveys a clear understanding of the objects prefaced above and while I have illustrated but a single working embodiment it should be understood that the method might be practiced by various means and the apparatus changed in respect to details of construction without departing from the spirit and scope of the invention as expressed in the appended claims, in which—

I claim:

1. The method of simultaneously cutting bars from a slab of plastic material and wrapping them, consisting in interposing a sheet wrapper between the material and a blade and moving the blade in a cutting stroke so as to press the wrapper ahead of it into the material and thereby cut the same, leaving a double thickness of wrapper between the separated portions of the material.

2. The method of simultaneously cutting bars from a slab of plastic material and applying a sheet wrapper, consisting in pressing a cutting blade against the wrapper intermediate its ends and continuing the pressure in a cutting stroke so that the wrapper envelopes the cutting edge and sides of the blade and is pressed thereby into the material, and withdrawing the blade, leaving the wrapper adhering to the separated sides of the material.

3. The method of simultaneously cutting bars from a slab of plastic material and wrapping them, consisting in interposing a continuous strip wrapper between a slab of material and a blade, advancing the material with respect to the blade in step-by-step movements to provide slack in the strip, imparting a cutting and a return stroke to the blade after each advance of the material, and feeding the wrapper with the blade upon each cutting stroke, the slack in the strip being used up in the cutting stroke, whereby the wrapper will envelope both sides of the blade and be pressed thereby into the material so as to cut the advanced portion therefrom and will adhere to the separated sides when the blade is withdrawn.

4. Apparatus for cutting and wrapping plastic material comprising, in combination, a blade, means for imparting a cutting and a return stroke to the blade, and means for positioning a wrapper across the path of the blade so that the wrapper will be fed into the material by the edge of the blade in the cutting stroke thereof, whereby to simultaneously cut and wrap said material.

5. In an apparatus for cutting and wrapping plastic material comprising a table adapted for carrying a slab of plastic material to be cut into bars and wrapped, and a blade reciprocable to and from said table, means for guiding a continuous strip wrapper so that it is interposed between the blade and the material to be pressed into the latter by the blade in the cutting strokes, and means for advancing the wrapper strip step by step to provide a certain amount of slack in the strip to be used up in the cutting stroke of the blade.

6. In an apparatus for cutting and wrapping plastic material comprising a table adapted for carrying a slab of plastic material to be cut into bars and wrapped, and a blade reciprocable to and from said table, means for guiding a continuous strip wrapper so that it is interposed between the blade and the material to be pressed into the latter by the blade in the cutting strokes, and means for advancing the wrapper strip step by step to provide a certain amount of slack in the strip to be used up in the cutting stroke of the blade, said means being arranged to feed the wrapper with the blade during each cutting stroke whereby the wrapper envelopes both sides of the blade and is pressed thereby into the material to adhere to the separated sides when the blade is withdrawn.

SWAN F. ANDERSON.